US010705980B2

(12) United States Patent
Neukirchner et al.

(10) Patent No.: US 10,705,980 B2
(45) Date of Patent: Jul. 7, 2020

(54) METHOD AND SYSTEM FOR MULTICORE COMMUNICATION WITH SAFETY PROPERTIES (71) Applicant: Elektrobit Automotive GmbH, Erlangen (DE)

(72) Inventors: Mortiz Neukirchner, Braunschweig (DE); Michael Stilkerich, Fuerth (DE); Niko Böhm, Emskirchen (DE); Simon Dürr, Nuremberg (DE)

(73) Assignee: ELEKTROBIT AUTOMOTIVE GMBH, Erlangen (DE)

( * ) Notice: Subject to any disclaimer, the term of this patent is extended or adjusted under 35 U.S.C. 154(b) by 135 days.

(21) Appl. No.: 16/008,837

(22) Filed: Jun. 14, 2018

(65) Prior Publication Data
US 2018/0365173 A1 Dec. 20, 2018

(30) Foreign Application Priority Data

Jun. 14, 2017 (DE) ........................ 10 2017 210 076

(51) Int. Cl.
*G06F 12/14* (2006.01)
*G06F 9/52* (2006.01)
(52) U.S. Cl.
CPC .......... *G06F 12/1425* (2013.01); *G06F 9/528* (2013.01); *G06F 2212/1052* (2013.01)
(58) Field of Classification Search
CPC .... G06F 9/526; G06F 2212/1052; G06F 9/52; G06F 12/1425; G06F 21/606; G06F 21/71
See application file for complete search history.

(56) References Cited

U.S. PATENT DOCUMENTS

| 7,380,106 | B1 | 5/2008 | Bilski |
| 9,135,210 | B2 | 9/2015 | Matsumoto et al. |
| 2002/0078119 | A1* | 6/2002 | Brenner ................. G06F 9/526 |
| | | | 718/102 |

(Continued)

OTHER PUBLICATIONS

Maged M. Michael, Michael L. Scott / Simple, Fast, and Practical Non-Blocking and Blocking Concurrent Queue Algorithms 201694005.

(Continued)

*Primary Examiner* — Tuan C Dao
(74) *Attorney, Agent, or Firm* — Cozen O'Connor (57) ABSTRACT

A method for sending communication data includes: ascertaining whether a configuration of a communication channel between a data-sending application and at least one data-receiving application can activate a write lock that precludes at least one further data-sending application from writing data to a first memory area; activating the write lock, if the configuration of the communication channel provides for the activation of the write lock; writing the communication data and sender state data indicating the communication data to the first data memory area; and deactivating the write lock if the configuration of the communication channel provides for the activation of the write lock. The data-sending and data-receiving applications each have read access to the first data memory area, and the activation of the write lock does not substantially adversely affect the read access by each of the data-sending and data-receiving applications to the first data memory area.

22 Claims, 7 Drawing Sheets

(56) References Cited

U.S. PATENT DOCUMENTS

| | | | | |
|---|---|---|---|---|
| 2002/0166061 | A1* | 11/2002 | Falik | G06F 12/1425 |
| | | | | 726/34 |
| 2010/0114848 | A1* | 5/2010 | McKelvie | G06F 16/2365 |
| | | | | 707/704 |
| 2014/0089539 | A1* | 3/2014 | Hudzia | G06F 9/52 |
| | | | | 710/52 |
| 2015/0286586 | A1* | 10/2015 | Yadav | G06F 9/528 |
| | | | | 711/152 |
| 2017/0123889 | A1* | 5/2017 | Haridas | G06F 16/10 |
| 2017/0329635 | A1* | 11/2017 | Rathke | G06F 9/5077 |

OTHER PUBLICATIONS

John Giaconomi, Tipp Moseley, Manisch Vachharajani / Fast Forward for Efficient Pipeline Parallelism: A Cache-Optimized Concurrent Lock-Free Queue / Feb. 20, 2008.

Mike Gerdes / Timing Analysable Synchronisation Techniques for Parallel Programs on Embedded Multi-Cores /Jul. 17, 2013.

XILINX, INC / Method and system for transferring data between a register in a processor and a point-to-point communication link / May 27, 2008.

Tops System Corporation / Processor Core and Multi-Core Processor System / Sep. 15, 2015 Michael Stilkerich / Memory Protection at Option: Application-Tailored Memory Safety in Safety-Critical Embedded Systems / Speicherschutz nach Wahl: Auf die Anwendung zugeschnittene Speichersicherheit in sicherheitskritischen eingebetteten Systemen.

Elektrobit Automotive GmbH / Software Design Document: Inter-OS-Applicaton Communicator /Apr. 11, 2015.

* cited by examiner

Fig. 1

Ascertain whether a configuration of a communication channel between a data-sending application and at least one data-receiving application provides for activation of a write lock that is configured to preclude, at least in part, at least one further data-sending application from writing data to a first memory area, and, if the configuration of the communication channel provides for the activation of a write lock, activate the write lock
210

Write communication data and sender state data indicating the communication data to the first data memory area
220

If the configuration of the communication channel provides for the activation of a write lock, deactivate the write lock
230

METHOD AND SYSTEM FOR MULTICORE COMMUNICATION WITH SAFETY PROPERTIES

BACKGROUND OF THE INVENTION

1. Field of the Invention

The present application generally relates to the field of communication in multicore environments. It particularly relates to a method for multicore communication with safety properties. The application further relates to a computer system, a computer program product, a motor vehicle controller and a motor vehicle.

2. Description of the Related Art

Computer systems increasingly comprise multicore computing environments. In this case, different computing applications can be executed on different processor cores of a computer system at the same time. This allows increased efficiency of the computer system. At the same time, applications executed on different processor cores can communicate with one another for the purpose of interchanging data. To this end, the computer system usually has a memory provided in it that is used as a buffer for the data interchange by the applications in a shared address space and to which both the data-sending applications and the data-receiving applications have access.

If multiple data-sending applications access the shared memory, there is the possibility of stored communication data of one data-sending application being overwritten or otherwise modified by another data-sending application before the data have been read by the intended receiving application. The communication between the first data-sending application and the addressed data-receiving application can be disturbed in this manner. In particular in safety-sensitive computer systems, such as a motor vehicle control system, for example, locking mechanisms are therefore regularly used. These prevent further applications from accessing the shared memory when data interchange is taking place between communicating applications. A lock is lifted, for example, if a data-receiving application signals that the sent data have been completely read from the shared memory.

Particularly in connection with multicore computing environments in which a data-sending application and a data-receiving application are executed on different processor cores, conflicts arise in regard to the required safety of the communication, on the one hand, and the sought high efficiency of the computer system, on the other hand. Conventional techniques have at least one of the following disadvantages, above all, in this case.

In many multicore computing environments with safety properties, writing and reading on one communication channel at the same time is not possible. Instead, the applications on the communication channel are reciprocally precluded. This requires the cores involved to have their timings coordinated, which has negative effects on operating time. It moreover goes against the principle of freedom from interference in time for the cores involved, which also adversely affects the safety of the computer system. In many microcontrollers, the reciprocal precluding of the applications also requires the privileged processor mode to be entered, which adds a considerable operating time overhead. Moreover, the parallelism at the application level is limited across core boundaries.

Data-sending and data-receiving applications also often need to have write access to the shared memory location at which communication data and/or status variables of the applications are stored. Memory protection in regard to write access rights is therefore not implementable. This violates the principle of freedom from interference in space, which in turn adversely affects the safety of the computer system.

In many cases, a microcontroller of a multicore computing environment needs to produce a coherent memory overview (for example in cache-coherent fashion) for all memory locations at which communication data and/or status variables are stored. Optimizations in regard to mapping of individual status variable regions or communication data regions onto non-coherently cached memory regions or core-local scratchpad memories are therefore not possible. This adversely affects the efficiency of the computer system.

A technique that avoids or reduces the aforementioned disadvantages is therefore desirable.

SUMMARY OF THE INVENTION

According to a first aspect, a method for sending communication data by a data-sending application that is executed on a first processor core of a computer system is provided. The data-sending application is configured to write communication data to a first data memory area of the computer system. The communication data are provided for reception by at least one data-receiving application executed on a second processor core of the computer system. The method comprises ascertaining whether a configuration of a communication channel between the data-sending application and the at least one data-receiving application provides for activation of a write lock that is configured to preclude, at least in part, at least one further data-sending application from writing data to the first memory area, and, if the configuration of the communication channel provides for the activation of a write lock, activating the write lock. The method further comprises writing the communication data and sender state data indicating the communication data to the first data memory area, and, if the configuration of the communication channel provides for the activation of a write lock, deactivating the write lock. In this case, each of the applications has read access to the first data memory area, and the activation of the write lock at least substantially does not adversely affect the read access by each of the applications to the first data memory area.

The data-receiving application can be precluded from write access to the first data memory area.

The communication data and the sender state data can be written to different partitions of the first data memory area. In this case, the communication data can be written to a first partition of the first data memory area, and the sender state data can be written to a second partition of the first data memory area. The first and second partitions of the first data memory area may be configured separately from one another. In particular, the first and second partitions of the first data memory area may be arranged in different memory apparatuses of the computer system.

At least two data-receiving applications that have read access to the first data memory area at the same time can be executed on the computer system. Each of the applications executed on the computer system can have read access to the first data memory area at any time.

The data-sending application may be a first data-sending application, and the write lock can comprise an intra-core write lock that is configured to preclude a second data-sending application executed on the first processor core of the computer system from write access to the first data memory area. In this case, a functionality of the intra-core write lock may be stored in a core-local memory associated with the first processor core. The functionality of the intra-core write lock can comprise portions of program code that, when executed on the computer system, prompt the computer system to provide the intra-core write lock.

Additionally or alternatively, the data-sending application may be a first data-sending application, and the write lock can comprise an inter-core write lock that is configured to preclude a second data-sending application executed on a third processor core of the computer system from write access to the first data memory area. In this case, a functionality of the inter-core write lock may be stored in the first data memory area. The functionality of the inter-core write lock can comprise portions of program code that, when executed on the computer system, prompt the computer system to provide the inter-core write lock.

The method can further comprise, before ascertaining whether the configuration of the communication channel provides for activation of a write lock, configuring the communication channel for the write lock at least in part on the basis of the at least one further data-sending application.

The communication channel can be configured before the first application is executed on the computer system for the first time. In particular, the communication channel can be configured before the computer system is started up. Additionally or alternatively, the communication channel can be configured in response to a change in regard to the at least one further data-sending application. In this case, the communication channel can be configured in response to addition or removal of the at least one further data-sending application in the computer system.

The communication data may be provided for reception by the data-receiving application according to a first-in-first-out, FIFO, semantic or a register semantic.

The communication data may be provided for reception by the data-receiving application according to a first-in-first-out, FIFO, semantic, and the method may further comprise, before writing the communication data, reading receiver state data from a second data memory area of the computer system, which is different from the first data memory area. In this case, the receiver state data can indicate completed reading of earlier communication data from the first memory area by a data-receiving application of the computer system. In this case, the data-sending application may be precluded from write access to the second data memory area. Moreover, the first data memory area may be configured for storing communication data of different communication processes at the same time. In this case, the first data memory area may be part of a communication channel for different data-writing and/or data-reading applications.

The second data memory area can comprise core-local memory associated with the second processor core. The first and second data memory areas may be comprised by a shared address space of the computer system.

Additionally or alternatively, the communication data may be provided for reception by the data-receiving application according to a register semantic, and the writing of the sender state data can comprise, before writing the communication data, writing first sender state data indicating a beginning of the writing of the application data, and, after writing the communication data, writing second sender state data indicating an ending of the writing of the communication data. In this case, the first data memory area may be configured for storing communication data just of one communication process. Moreover, the first data memory area may be part of a communication channel for different data-writing and/or data-reading applications. The first and second sender state data can indicate that the communication data are present as consistent communication data in the first memory area.

According to a second aspect, a method for receiving, by a data-receiving application, communication data written to a first data memory area of the computer system by a data-sending application that is executed on a first processor core of a computer system is described. The data-receiving application is executed on a second processor core of the computer system. The method comprises reading sender state data from the first data memory area by the data-receiving application, ascertaining whether the sender state data indicate the presence of consistent communication data in the first data memory area, and, if the sender state data indicate the presence of consistent communication data, reading the communication data from the first data memory area by the data-receiving application.

The communication data can be received according to a first-in-first-out, FIFO, semantic, and the method can further comprise, after reading the communication data, writing receiver state data indicating the reading of the communication data by the data-receiving application to a second data memory area of the computer system, which is different from the first data memory area. In this case, the data-sending application may be precluded from write access to the second data memory area.

Additionally or alternatively, the communication data can be received according to a register semantic, wherein the sender state data comprise first sender state data, which indicate a beginning of writing of communication data by a data-sending application of the computer system, and second sender state data, which indicate an ending of writing of communication data by a data-sending application of the computer system, and the ascertaining of whether the sender state data indicate the presence of consistent communication data comprises comparing the first and second sender state data.

According to a third aspect, a computer program product is described. The computer program product comprises portions of program code stored on a non-transitory computer-readable medium that, when executed on a computer system, prompt the computer system to perform the method of the type presented here.

According to a fourth aspect, a computer system for sending communication data by a data-sending application that is executed on a first processor core of the computer system and that is configured to write communication data to a first data memory area of the computer system is described. The communication data are provided for reception by at least one data-receiving application executed on a second processor core of the computer system. The computer system is configured for ascertaining whether a configuration of a communication channel between the data-sending application and the at least one data-receiving application provides for activation of a write lock that is configured to preclude, at least in part, at least one further data-sending application from writing data to the first memory area, and, if the configuration of the communication channel provides for the activation of a write lock, activating the write lock, writing the communication data and sender state data indicating the communication data to the first data memory area, and, if the configuration of the communication channel provides for the activation of a write lock, deactivating the write lock. In this case, each of the applications has read access to the first data memory area, and the activation of the write lock at least substantially does not adversely affect the read access by each of the applications to the first data memory area.

According to a fifth aspect, a computer system for receiving, by a data-receiving application, communication data written to a first data memory area of the computer system by a data-sending application that is executed on a first processor core of the computer system is provided. The data-receiving application is executed on a second processor core of the computer system. The computer system is configured to read sender state data from the first data memory area by the data-receiving application, to ascertain whether the sender state data indicate the presence of consistent communication data in the first data memory area, and, if the sender state data indicate the presence of consistent communication data, to read the communication data from the first data memory area by the data-receiving application.

The computer system may be part of a motor vehicle controller.

According to a sixth aspect, a motor vehicle controller is described. The motor vehicle controller comprises a computer system of the type presented here.

According to a seventh aspect, a motor vehicle is described. The motor vehicle comprises a motor vehicle controller of the type presented here.

BRIEF DESCRIPTION OF THE DRAWINGS

Further features, objects and advantages of the technique presented here will become clear from the drawings and the detailed description. In the figures.

DETAILED DESCRIPTION OF THE PRESENTLY PREFERRED EMBODIMENTS

Figure 1:
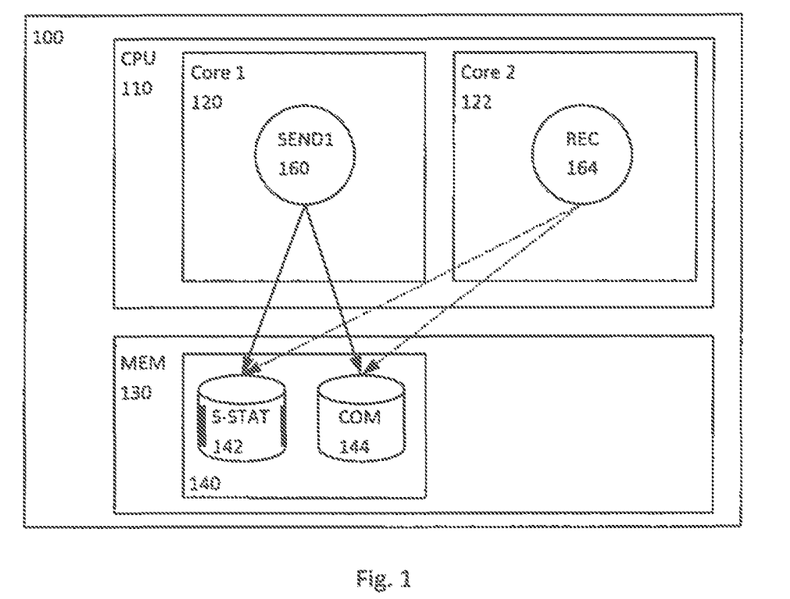
FIG. 1: shows a schematic depiction of a computer system for multicore communication with safety properties according to an exemplary embodiment.

FIG. 1 shows a schematic depiction of a computer system 100. The computer system 100 comprises a processor unit 110 that comprises multiple processor cores 120, 122. The computer system 100 also comprises a memory apparatus 130 having a data memory area 140. The processor unit 110 is communicatively connected to the memory apparatus 130.

The abbreviations and designations used in FIG. 1 and in the figures that follow are explained in table 1.

In the example shown in FIG. 1, a data-sending application 160 is executed on a first processor core 120 of the processor unit 110. By contrast, a data-receiving application 164 is executed on a second processor core 122 of the processor unit 110. The data-sending application 160 and the data-receiving application 164 are applications communicating with one another. In this case, the data-sending application 160 is configured to send data for reception by the data-receiving application 164. Communication data are sent from the data-sending application 160 to the data-receiving application 14 by writing the communication data to the memory area 140 by the data-sending application 160. The communication data are read from the memory area by the data-receiving application 164. As depicted by a solid arrow in FIG. 1, the data-sending application 160 has write access to the data memory area 140 for this purpose, and, as depicted by a dashed arrow, the data-receiving application 164 has read access to the data memory area 140.

In the example shown in FIG. 1, the data-receiving application 164 does not write data to the memory area 140. By way of example, the data-receiving application 164 may be precluded from write access to the data memory area 140. Access to the data memory area 140 by the data-receiving application 164, which access is limited to read access, therefore does not alter the data present in the data memory area 140. In particular, writing of communication data by the data-sending application 160 to the data memory area 140 is not disturbed by execution of the data-receiving application 164 at the same time and any read access to the data memory area 140 by the data-receiving application 164 that is effected in the process. Safety of the communication between the applications 160, 164 is therefore not adversely affected by the data-receiving application 164. The same applies to the case in which, as a departure from the example shown in FIG. 1, multiple data-receiving applications that each have read access to the data memory area 140 are executed on the processor unit 110.

Reciprocal preclusion of the data-sending application and the data-receiving application, or of data-receiving applications among one another, from the respectively provided type of access to the data memory area 140 to avoid interference between the applications is not required in the example of FIG. 1. The applications 160, 164 on the different processor cores 120, 122 of the computer system 100 can therefore be executed in parallel and in a manner decoupled from one another in the examples described. There is thus also no need for the processor cores 120, 122 to have their timings coordinated for execution of the respective applications 160, 164.

Apart from writing communication data to the data memory area 140, the data-sending application 160 also writes sender state data to the data memory area 140. In the example of FIG. 1, the sender state data are written to a first partition 142 and the communication data are written to a second partition 144 of the data memory area 140. The data-receiving application 164 has read access to the first and second partitions 142, 144 of the data memory area 140. At least one portion of the sender state data is written to the data memory area 140 by the data-sending application 160 in regard to a current communication process between the data-sending application 160 and the data-receiving application 164 and is read by the data-receiving application 164 in connection with the same current communication process.

Suitable sender state data, as described in more detail below, allow the data-receiving application 164 to ascertain whether the data memory area 140 contains consistent communication data for reading by the data-receiving application 164. By way of example, there is the possibility of the writing of the communication data by the data-sending application 160 not having been completed yet after the data-receiving application 164 is called. In this case, reading of the communication data by the data-receiving application 164 would result in only incomplete transmission of the communication data. The transmitted communication data would therefore not be consistent. Similarly, in some examples, it is possible that the data memory area 140 has communication data written to it in connection with a subsequent communication process before reading of the communication data of the previous communication process by the data-receiving application 164 is complete. In this case too, the data-receiving application 164 would not read any consistent communication data from the data memory area 140. The provision of suitable sender state data allows such cases to be ascertained by the data-receiving application 164. If the data-receiving application 164 then establishes that consistency of the read communication data is not ensured, the data-receiving application 164 indicates an error in the communication, for example. In this case, the communication process is repeated until the transmission of consistent communication data has been ascertained. The same applies accordingly to the case in which multiple data-receiving applications 164 are executed on the processor unit 110, wherein the respectively addressed data-receiving application checks the presence of consistent communication data.

The writing of the sender state data to the data memory area 140 primarily allows a check on whether a communication process has been performed successfully. It is thus possible, when a communication process has failed, for a corrective measure to be initiated, for example by repeating the communication process. At the same time, communication data can be sent by the data-sending application 160 in connection with successive communication processes with one or more data-receiving applications 164 in a manner temporally decoupled from reading of the data from the data memory area 140 by the one or more data-receiving applications 164. In particular, secure transmission of the communication data between the applications 160, 164 is also ensured when the applications 160, 164 are executed at the same time. In the case of a data-sending application 160 in communication with any number of data-receiving applications 164, the computer system 100 allows increased timing efficiency in comparison with conventional computer systems operated with reciprocal preclusion of the applications. The decoupled execution of the applications also attains a higher level of safety in the control of the computer system 100. At the same time, the transmission of consistent communication data is ensured.

In the example of FIG. 1, the data in the data memory area 140 are modified only by the data-sending application 160. As such, a disturbance in a communication process can also be effected only by the same data-sending application 160, for example by a subsequent communication process, which in turn is easily ascertainable on the basis of the sender state data. This is not ensured, however, if multiple data-sending applications that each use the data memory area 140 as part of a communication channel with one or more data-receiving applications 164 are executed on the processor unit 110.

In this case, it would also be possible for inconsistent sender state data to be produced. In such instances, there is therefore a need for reciprocal timing preclusion among multiple applications. This preclusion can be restricted to data-sending applications, however, and also needs to relate only to write access to the data memory area 140. To this end, during a write process by one of the data-sending applications, for example, a write lock is activated for further data-sending applications.

The need for a write lock is dependent on the individual configuration of the computer system 100 for one or more data-sending applications using the same data memory area 140 as part of a communication channel. Accordingly, the communication channel of each data-sending application 160 is configurable such that the data-sending application 160, before writing data to the data memory area 140 via this communication channel, first of all takes the configuration of the communication channel as a basis for ascertaining whether there is then provision for activation of a write lock. If there is provision for a write lock according to the configuration of the communication channel, such activation is effected by the data-sending application. After the communication data are written to the data memory area 140, the write lock is deactivated again by the data-sending application 160. This allows the use of write locks between data-sending applications 160 to be restricted to a minimum.

Figure 2:
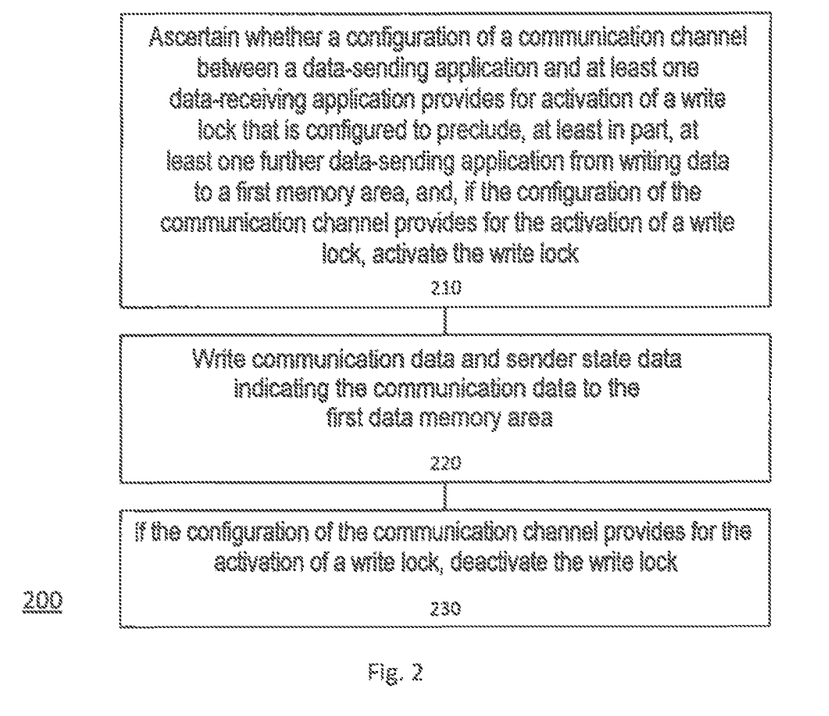
FIG. 2: shows a flowchart for a method for sending communication data according to a further exemplary embodiment.

FIG. 2 shows an example of a method 200 for sending communication data in a multicore computing environment. The method 200 is performable by the application 160 in the computer system 100 shown in FIG. 1, for example. According to the method 200, it is first of all ascertained whether a configuration of the communication channel between the data-sending application and at least one data-receiving application has provision for the activation of a write lock, at step 210. In this case, the write lock is configured to preclude, at least in part, at least one further data-sending application from writing data to a memory area that is used by the data-sending application. If the configuration of the communication channel provides for the activation of a write lock, the write lock is activated.

As described in connection with FIG. 1, the activation of the write lock allows interference between multiple data-sending applications to be avoided. At the same time, each communication channel in the multicore computing environment may be configured on the basis of a communication pattern of all communicating applications such that there is provision for the activation of a write lock only in the event of multiple data-sending applications interfering in a shared data memory area.

By way of example, one or more communication channels are configured statically before the computer system is started up. This is appropriate if there is provision for a substantially static configuration of communicating applications for the computer system. This is often the case with motor vehicle controllers. The configuration of such devices is only rarely subjected to changes in regard to applications executed on different processor cores and the communication responses of such applications among one another. In alternative examples, one or more communication channels are configured in a dynamic manner, for example when a change in a configuration of the applications is ascertained. This is the case, by way of example, when a data-sending application that uses the same communication channel as another data-sending application present is added or removed.

The method 200 further comprises writing the communication data and sender state data indicating the communication data to the data memory area, at step 220. If the configuration of the communication channel provides for the activation of a write lock, and the lock has consequently been activated, the previously set write lock is also deactivated, at step 230. In this case, the write lock is deactivated on the basis of the configuration of the communication channel that has already been analysed in step 210, for example, or of activation of the write lock that has been effected on the basis thereof.

Figure 3:
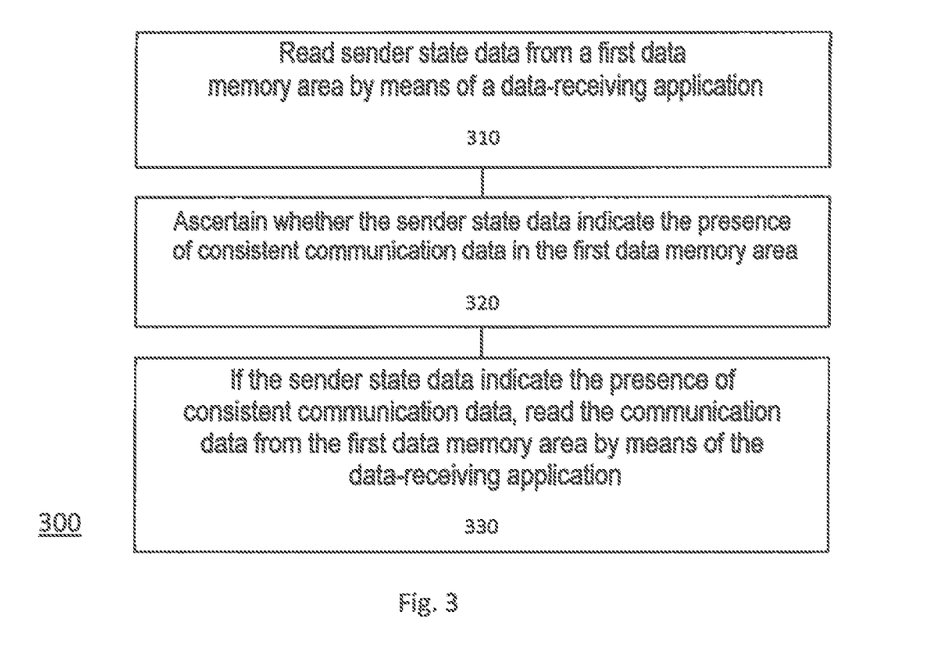
FIG. 3: shows a flowchart for a method for receiving communication data according to a further exemplary embodiment.

FIG. 3 shows an example of a method 300 for receiving communication data in a computer system that comprises a multicore computing environment. By way of example, the method 300 is executable by the data-receiving application 164 of the computer system 100 shown in FIG. 1. The method 300 comprises reading sender state data from a data memory area of the computer system, at step 310. Also, it is ascertained, at step 320, whether the sender state data indicate the presence of consistent communication data in the data memory area. If the sender state data indicate the presence of consistent communication data, the communication data are read from the first data memory area, at step 330.

In some examples, if the sender state data do not indicate the presence of consistent communication data, the data-receiving application also outputs an indication that no consistent communication data have been able to be read. Also, in some examples, if the presence of consistent communication data has been ascertained and the communication data have been read successfully, the data-receiving application outputs an indication that consistent communication data have been read successfully.

Figure 4:
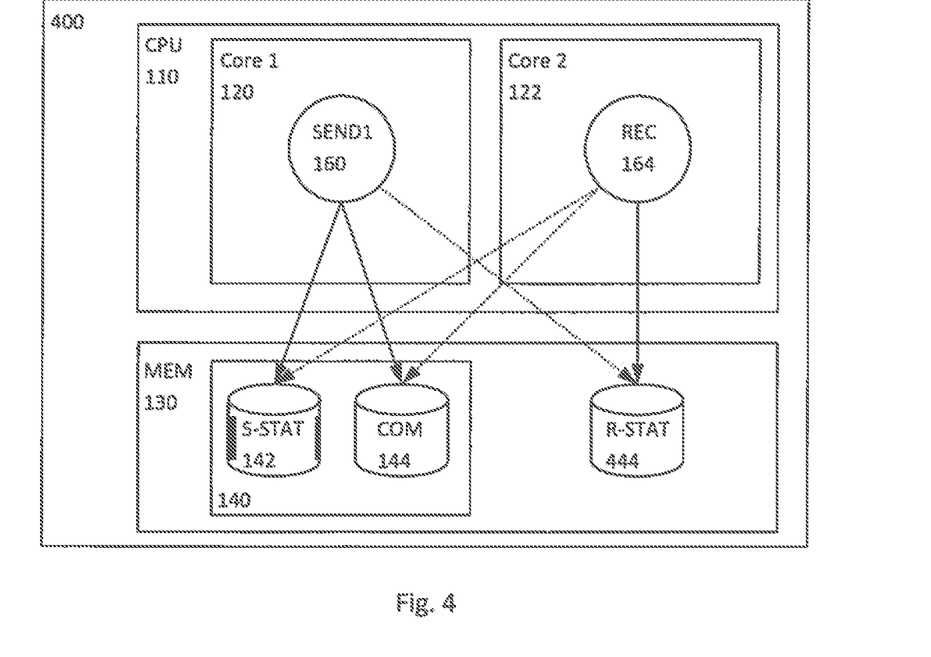
FIG. 4-6: show schematic depictions of computer systems for multicore communication with safety properties according to further exemplary embodiments.

FIG. 4 shows a schematic depiction of a further example of a computer system 400. Analogously to the computer system 100 from FIG. 1, the computer system 400 comprises a processor unit 110 having a first processor core 120 and a second processor core 122 and also comprises a memory apparatus having a data memory area 140. Also, the computer system 400 is configured such that a data-sending application 160 that communicates with a data-receiving application 164 executed on the second processor core 122 is executed on the first processor core 120. In this case, as in the example of FIG. 1, the data-sending application 160 has write access to the data memory area 140, whereas the data-receiving application 164 has read access to this data memory area 140. In regard to the aforementioned features, the statements made in connection with the computer system 100 from FIG. 1 apply accordingly.

In a departure from the example from FIG. 1, the computer system 400 from FIG. 4 has a second data memory area 444 in addition to the first data memory area 140 of the memory apparatus 130. In this case, the data-sending application 160 is precluded from write access to the second data memory area 444, but has read access to the second data memory area 444. By contrast, the data-receiving application 164 has write access to the second data memory area and is configured to write receiver state data to the second data memory area 444. The receiver state data are provided in this case for reading by the data-sending application 160 or any further data-sending applications (not depicted) of the computer system 400, for example. In a departure from the example from FIG. 4, in other examples the second data memory area 444 is not arranged in the memory apparatus 130. By way of example, the second data memory area 444 comprises core-local memory associated with the second processor core 122.

The provision of receiver state data by the data-receiving application 164 for reading by the data-sending application 160 extends the application possibilities of the previously described techniques for multicore communication with safety properties given simultaneously reduced restricting interaction between different applications and/or cores. In particular, the provision of suitable receiver state data allows communication data to be sent and the presence of consistent communication data for particular semantics that would not be applicable solely on the basis of sender state data to be ascertained.

Receiver state data are dispensable, as shown in FIG. 1, if the one or more data-sending applications 160 and the one or more data-receiving applications 164 communicate on the basis of a register semantic, wherein the data memory area 140 is configured for storing communication data just for one communication process. In this case, communication data can be written to the communication channel independently of a receiver state. By way of example, the memory area 140 has communication data from a current communication process written to it or overwritten in it in each case. By contrast, a check for the presence of consistent communication data is effected, as described in connection with FIG. 1, by the data-receiving application 164 on the basis of the sender state data.

By contrast, the provision of receiver state data, too, allows, by way of example, communication between the applications 160, 164 on the basis of what is known as a first-in-first-out, FIFO, semantic, in which the data memory area 140 is used as ring memory for communication data of different communication processes. The communication data of successive communication processes are written to successive memory locations of the ring memory in this case, for example. The communication data of the respectively addressed data-receiving application 164 are read from the respective memory location of the ring memory in corresponding order.

The communication data are typically read in delayed fashion in comparison with the writing of the communication data. Whereas a memory location of the ring memory whose communication data are read by the addressed data-receiving application can be overwritten for a further communication process, the possible delay in the reading of the different communication data means that it is necessary to signal to a data-sending application 160 whether there is still a free memory location in the ring memory, or a memory location to which data have already been written has already been read and can be overwritten, or whether all of the memory locations of the ring memory have had communication data of other communication processes written to them, none of which have been read yet. In this case, sending of further communication data would result in as yet unread earlier communication data being overwritten and hence in a disturbance in the previous communication process.

A current reading situation for the ring memory is ascertainable on the basis of suitable receiver state data. This is effected, in some examples, by all of the data-sending applications 160 progressively increasing a write index in the sender state data incrementally in each write process for communication data, while all of the data-receiving applications 164 progressively increase a receiver index incrementally in each read process in an analogous manner. At the beginning of a communication process, this allows a called data-sending application to compare the write index and the receiver index to ascertain whether or not a difference between these indices indicates the presence of free or overwritable memory locations. If the difference between the write index and the receiver index is N or more, for example, then the ring memory has currently had as yet unread communication data written to it entirely. If the difference between the write index and the read index is less than N, on the other hand, this indicates the presence of at least one free or overwritable memory location in the ring memory. The sending process by the data-sending application 160 can therefore be effected without this disturbing a previous communication process.

Instead of progressive incrementation, in one example both the write index and the read index are cyclically incremented from 0 to 2N−1. To ascertain the presence of a free memory location, the difference between the write index and the read index is first of all increased by the value 2N and subsequently divided by 2N in this case. If the remainder from the division is N or more, this indicates a full ring memory. A remainder of less than N, on the other hand, indicates the presence of a free or overwritable memory location. Incrementation of the write index and the read index beyond N index values in each case promotes meaningful evaluation of the separately incremented indices, as compared with conventional indexing. By way of example, cyclic incrementation over just N index values for a difference of more than N between write and read processes would not permit a distinction between the presence of an overfilled ring memory and that of free or overwritable memory locations. Also, both when a ring memory has been read completely, i.e., for a difference of zero between write index and read index, and when a ring memory is completely full, i.e., for a difference of N between write index and read index, identical write and read indices could be present in each case.

Figure 5:
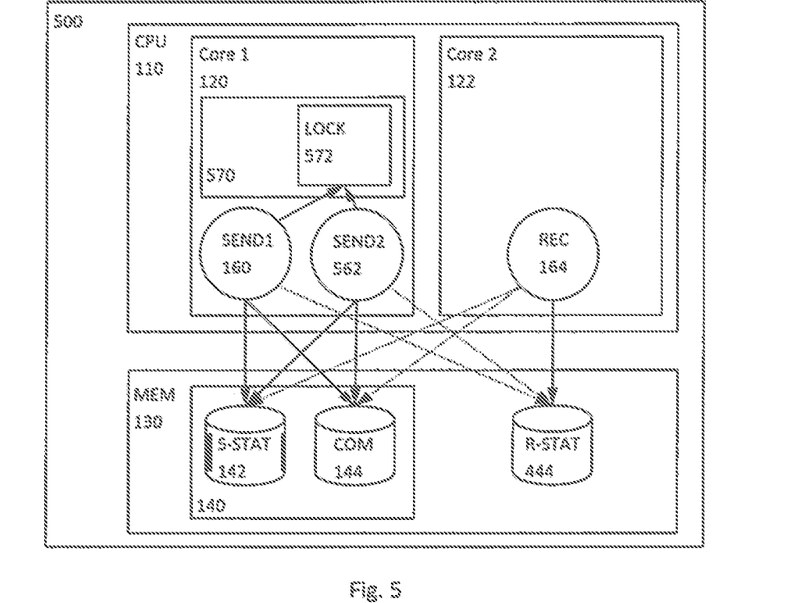

FIG. 5 shows a further example of a computer system 500 having a processor unit 110 that has multiple processor cores 120, 122 and having a memory apparatus 130. With the exception of the features described in more detail below, the statements made in connection with FIG. 1 and FIG. 4 apply accordingly to the computer system 500. In this case, the same reference signs indicate corresponding features and functions. In particular, the data-receiving application 164 in the example shown in FIG. 5 is configured to write receiver state data to a second data memory area 444 of the memory apparatus 130 for reading by the data-sending application 160. In different examples, no such writing of receiver state data is effected, on the other hand, in accordance with the statements made in connection with the computer system 100 from FIG. 1.

Unlike in the case of the examples from FIGS. 1 and 4, the computer system 500 in FIG. 5 has a second data-sending application 562 being executed on the first processor core 120 of the processor unit 110. In this case, the second data-sending application 562, like the first data-sending application 160, is configured to write communication data to the first data memory area 140. As explained in connection with FIG. 1, there is the possibility in this case of the two data-sending applications 160, 562 interfering and disturbing a communication process of the respective other data-sending application 160, 562 by writing data to the first data memory area 140. In order to prevent such disturbance of a communication process by a further data-sending application, the computer system 500 has a write lock 572. The write lock 572 can be activated by either of the two data-sending applications 160, 562 during a sending process. This ensures that the data-sending applications 160, 562 do not write data, for example sender state data and/or communication data, to the first data memory area 140 at the same time.

The computer system 500 involves the first data-sending application 160 and the second data-sending application 562 being executed on the same processor core 120. The write lock 572 is therefore configured as an intra-core lock. In the example shown, a functionality of the write lock 572 is also stored at least in part in a core-local memory 570 associated with the first processor core 120. In other examples, the functionality of the write lock 572 is stored in another memory area of the computer system 500, on the other hand, to which the first processor core 120 has access.

Figure 6:
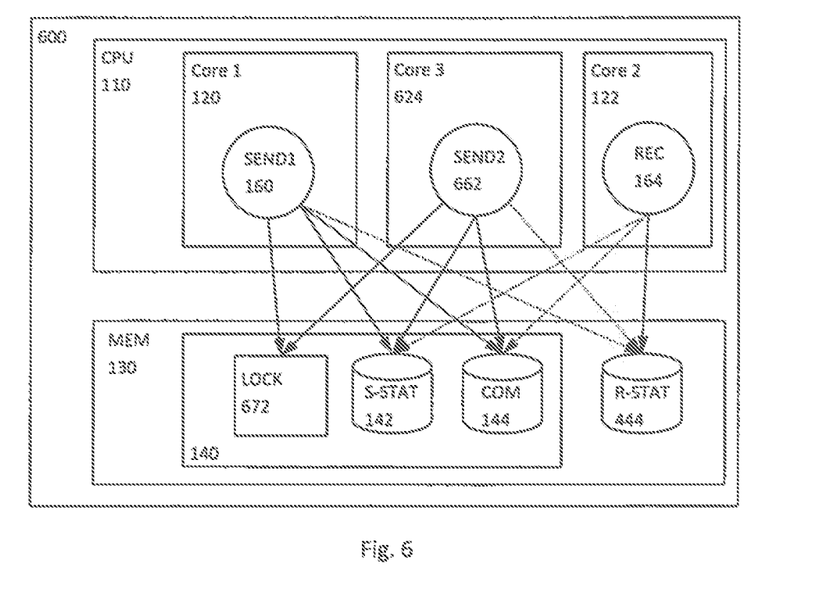

FIG. 6 shows a further example of a computer system 600. With the exception of the differing features described below, the statements made in connection with the computer system 500 from FIG. 5 apply accordingly to the computer system 600. In a departure from the computer system 500 from FIG. 5, the computer system 600 has a third processor core 624. Moreover, the second data-sending application 662 is executed not on the same processor core 120 as the first data-sending application 160 but rather on the third processor core 624. In the computer system 600, there is therefore the possibility of different data-sending applications 160, 662 executed on different processor cores 120, 624 of the computer system 600 interfering and disturbing a communication process of the respective other data-sending application 160, 662. Analogously to the computer system 500 from FIG. 5, the computer system 600 therefore also has provision for a write lock 672. This acts as an inter-core lock in the computer system 600, however. In the example shown, a functionality of the write lock 672 is stored at least in part in the first data memory area 140. In other examples, on the other hand, the functionality of the write lock 672 is stored in other memory areas of the computer system 600.

Figure 7:
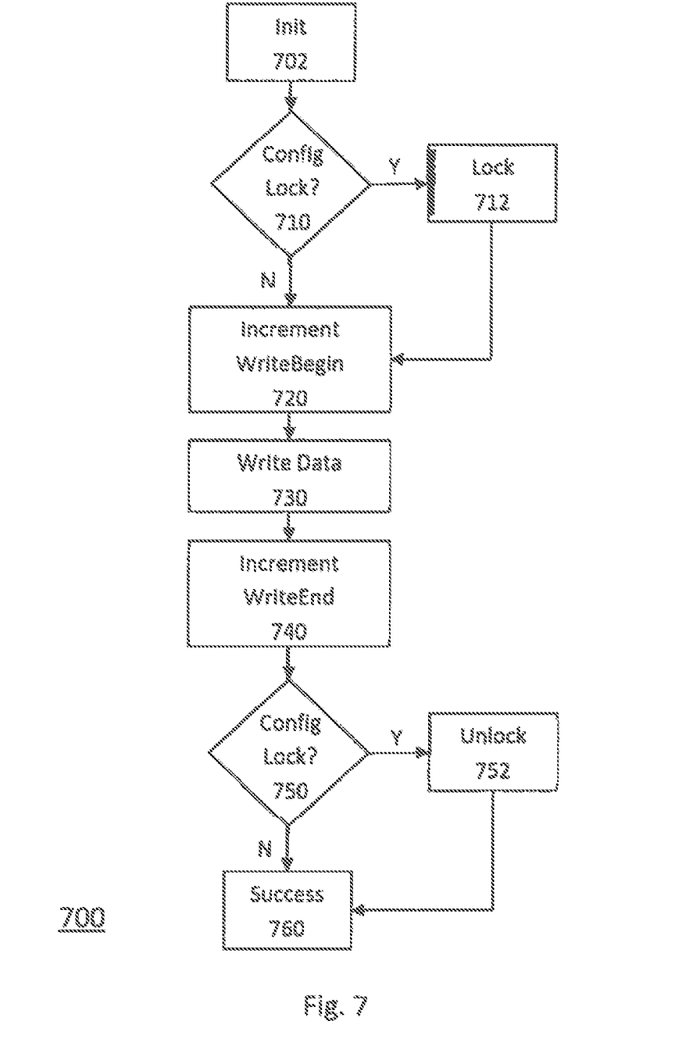
FIG. 7: shows a flowchart for a method for sending communication data using a register semantic according to an exemplary embodiment.

FIG. 7 shows an example of a method 700 for sending communication data in a multicore computing environment with safety properties. The method 700 is performable, by way of example, by any of the data-sending applications 160, 562, 662, as described in connection with FIGS. 1, 5 and 6. The method 700 is provided for the purpose of sending communication data in connection with a register semantic, for example. The method 700 is an example of the method 200 depicted in FIG. 2.

After the data-sending application is called, at block 702, it is ascertained, at block 710, whether a configuration of the communication channel to be used by the data-sending application for the current communication process has provision for the activation of a write lock. This is the case, by way of example, for each of the data-sending applications 160, 562, 662 of the communication structures shown in FIGS. 5 and 6, whereas in the examples from FIGS. 1 and 4 the configuration of a communication channel of the data-sending application 160 advantageously provides for no activation of a lock in regard to another application. If the configuration of the communication channel provides for activation of a write lock, Y branch from block 710, the write lock specified in the configuration of the communication channel, for example an intra-lock or an inter-lock, is activated. Otherwise, such setting of a lock, N branch from block 710, does not occur.

Next, a write beginning index associated with the data memory area and indicating the beginning of sending of communication data is incremented among the sender state data, at block 720. Subsequently, the communication data are written to the data memory at area, at block 730. After the writing of the communication data ends, a further index in the form of a write end index is increased among the sender state data, at block 740. During the writing of the communication data, at block 730, the write beginning index and the write end index therefore differ. If, by contrast, all begun write processes for communication data have been completed, the write beginning index and the write end index are equal to one another. In this manner, the sender state data indicate whether writing of communication data is currently taking place and the data present in the data memory area are therefore currently inconsistent.

After the incrementing of the write end index, a write lock possibly set in block 712 is deactivated again, at block 750 and Y branch therefrom, on the basis of whether the configuration of the communication channel has provided for the activation of a write lock. This successfully completes the sending of communication data, at block 760.

Figure 8:
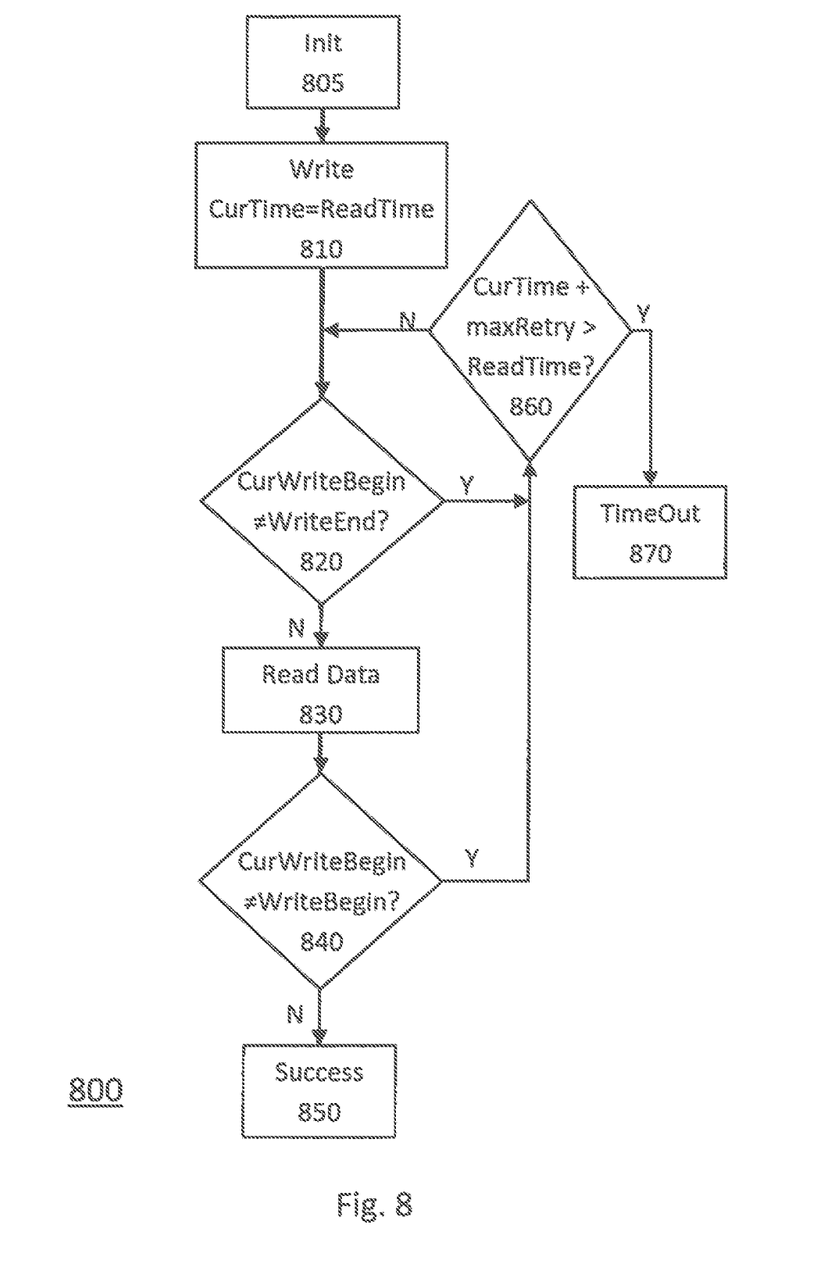
FIG. 8: shows a flowchart for a method for receiving communication data using a register semantic according to an exemplary embodiment.

FIG. 8 shows an example of a method 800 for receiving communication data in a multicore computing environment with safety properties. The method 800 is an example of the method 300 from FIG. 3, in particular in connection with a register semantic and a method for sending communication data according to the method 700 from FIG. 7. The method 800 is performable, by way of example, by any of the data-receiving applications 164, as described in connection with FIGS. 1, 5 and 6.

After the data-receiving application is called, at block 805, a current time is first of all captured and stored, at block 810. The current time is provided via an interface of the computer system, for example, in this case. Subsequently, the data-receiving application reads the sender state data to compare the write beginning index stored therein with the write end index likewise stored therein. If the values thereof differ, Y branch from block 820, a current time is compared with the previously read and stored time when the data-receiving application is called. If the difference between the two times is less than a predetermined repetition period, at block 820 is repeated in order to ascertain whether the previously established write process is still continuing or has been completed in the meantime. If a current write process is ascertained again in the repeatedly performed step of block 820, Y branch from block 820, and if it is ascertained in the step of block 860 that is then performed again that the difference between a current time and the stored time when the data-receiving application is called is more than the predetermined repetition period, the method is terminated owing to timeout, at block 870. Blocks 860 and 870 are an optional safety precaution in this case in order to ensure that the method 800 is terminated in the event of a failed communication process.

If it is established in block 820 that all write processes are currently complete, N branch from block 820, the communication data are read from the data memory area, at block 830. At the same time, the write beginning index most recently read from the sender status data is stored temporarily.

After the reading of the communication data is ended, the sender state data are read again for the current write beginning index. If this reveals a difference between the stored write beginning index before the communication data are read and the value of this index ascertained after the communication data are read, this indicates that a further write process, for example in connection with a further communication process, has started during the reading of the communication data. In that case, it is possible that the communication data that have been read in connection with block 830 have been disturbed by the further communication process starting during reading and that the read communication data are not consistent, Y branch from block 840. In this case, the method is continued with block 860, that is to say that the read process would be performed again, beginning with the initial checking for the presence of consistent communication data, at block 820, or termination of the method in the event of timeout, at block 870. At the same time, in some examples, an indication of the failed reading of consistent communication data is output. In that case, the communication data are sent again, for example, by the corresponding data-sending application.

If, by contrast, it is ascertained in block 840 that a further write process has not begun during the reading of the communication data, N branch from block 840, the reception of the communication data has been completed successfully, at block 850. In this case, the data-receiving application outputs an indication that the communication process has been ended successfully, for example.

Figure 9:
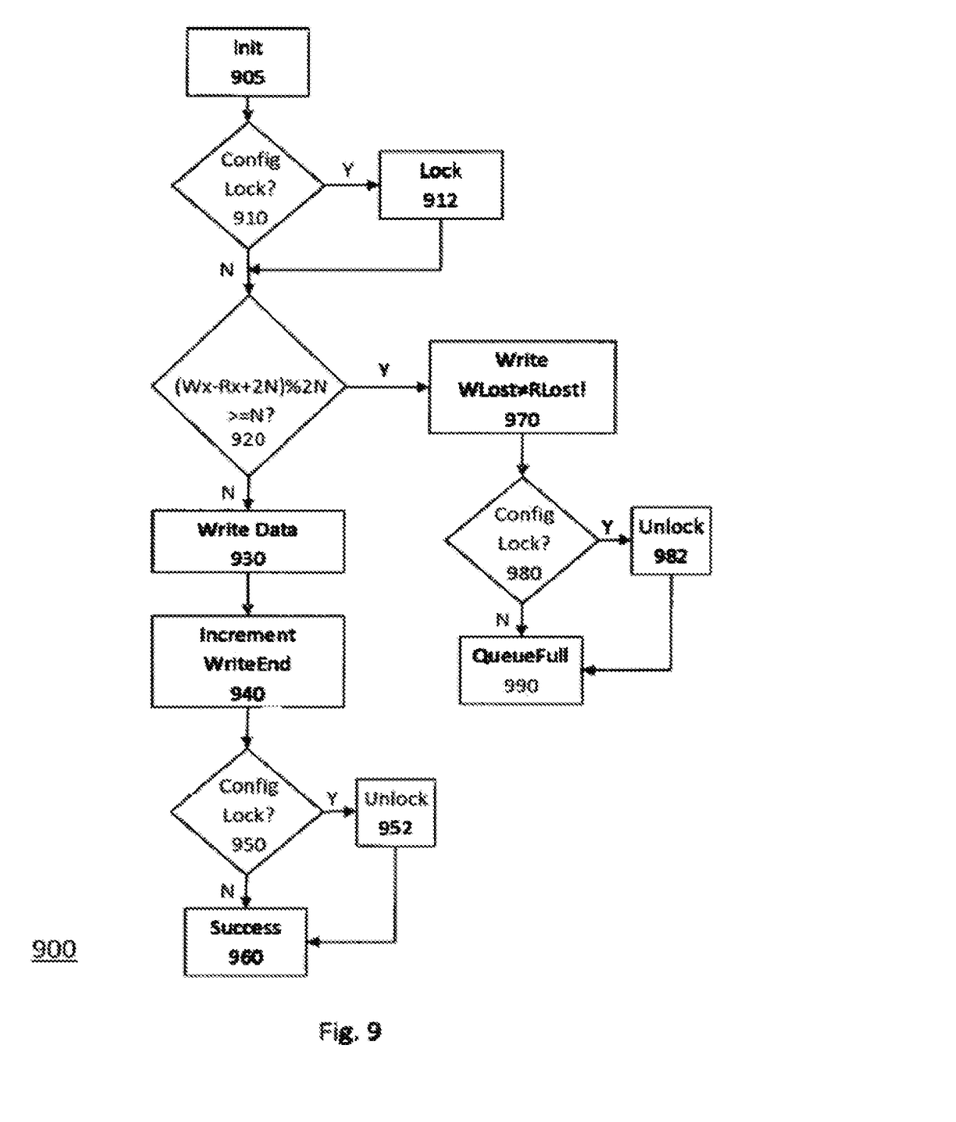
FIG. 9: shows a flowchart for a method for sending communication data using a first-in-first-out, FIFO, semantic according to an exemplary embodiment.

FIG. 9 shows an example of a method 900 for sending communication data in a multicore computing environment with safety properties. The method 900 is a further example of the method 200 from FIG. 2, in particular in connection with a first-in-first-out, FIFO, semantic. The method 900 is performable, by way of example, by any of the data-sending applications 160, 562, 662 according to FIGS. 4 to 6.

Analogously to the method 700 from FIG. 7, the method 900 involves, after calling the data-sending application, at block 905, ascertaining whether the configuration of the communication channel provided for the communication process provides for activation of a write lock, at block 910, and possibly the activation of the write lock specified in the configuration of the configuration channel, at block 912. Subsequently, it is ascertained whether the ring memory with N memory locations that is used for the communication channel has a free or overwritable memory location, at block 920. This is effected, by way of example, by comparing a write index among the sender state data and a receiver index among the receiver state data, as described in connection with FIG. 4. If this reveals that there is currently no memory location available for the communication process, Y branch from block 920, the data-sending application signals the failure of the communication process, at block 970, for example by setting an index W-Lost so as not to be equal to another index R-Lost. Also, if the configuration of the communication channel has provided for the activation of a write lock, at block 980, the write lock is deactivated, at block 982. The method 900 is then ended, at block 990, owing to an overfilled memory queue.

If, by contrast, it is ascertained in block 920 that there is memory space available in the data memory area for the current communication process, N branch from block 920, the communication data are written to the next free memory location, at block 930. Subsequently, a write end index is incremented among the sender status data, at block 940, the index indicating an end of the writing of the communication data to the data memory area. Subsequently, in this case too, a write lock possibly set beforehand is deactivated, at blocks 950, 952, and the method is thus ended successfully, at block 960.

Figure 10:
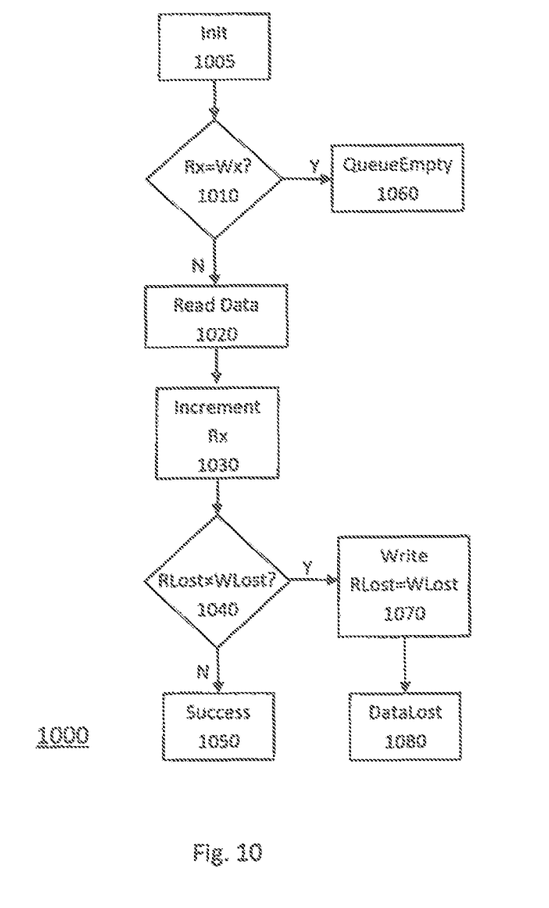
FIG. 10: shows a flowchart for a method for receiving communication data using a first-in-first-out, FIFO, semantic according to an exemplary embodiment.

FIG. 10 shows an example of a method 1000 for receiving communication data in a multicore computing environment with safety properties. The method 1000 is a further example of the method 300 from FIG. 3, in particular in connection with a first-in-first-out, FIFO, semantic, for example in connection with the method 900 from FIG. 9. The method 1000 is performable, by way of example, by any of the data-receiving applications 164, as described in connection with FIG. 4 to 6.

After the data-receiving application is called, at block 1005, for example owing to initiation of a relevant communication process, the write and read indices stored among the sender state data and receiver state data associated with the data memory area are first of all compared, at block 1010. If this reveals that the write index and the read index are equal, it follows from this that all of the written communication data have also already been read and that there are therefore no new communication data present for reading by the data-receiving application. The method 1000 is therefore ended owing to the absence of communication data, at block 1060.

If the write index differs from the read index, N branch from block 1010, on the other hand, this means that new communication data are present and the communication data are read from the memory area, at block 1020.

Following the reading of the communication data, the data-receiving application increases the receiver index among the receiver state data incrementally, at block 1030. This indicates that reading of the communication data is complete and hence also that the memory space is available for subsequent communication processes, as described in connection with block 920 of the method 900 from FIG. 9.

The method 1000 further comprises ascertaining whether the parameters R-Lost and W-Lost possibly modified by the data-sending application beforehand are equal or unequal, at block 1040. If these parameters are unequal, Y branch from block 1040, and the data-receiving application therefore detects that the memory queue is overfilled, these parameters are set equal again, at block 1070, and the method is ended with the result that a data loss has occurred, a t block 1080. The communication process is therefore detected as failed. If, by contrast, at block 1040 reveals that no overfilling of the memory queue has occurred or has been ascertained during the sending of the communication data, N branch from block 1040, the method 1000 is ended as successful, at block 1050.

Figure 11:
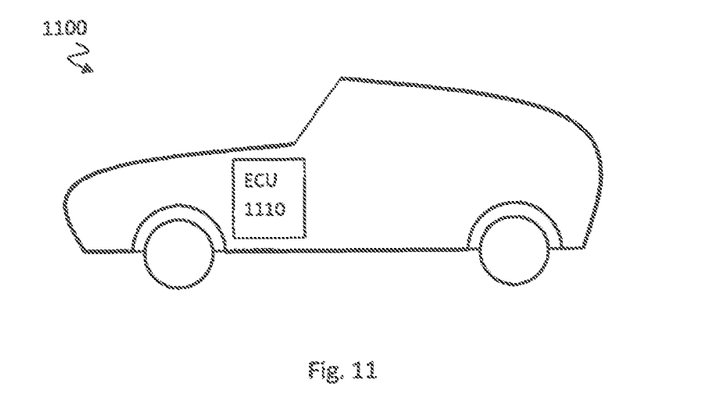
FIG. 11: shows a schematic depiction of a motor vehicle having a computer system for multicore communication with safety properties according to an exemplary embodiment.

FIG. 11 shows an example of a motor vehicle 1100. The motor vehicle 1100 comprises a motor vehicle controller 1110. The motor vehicle controller 1110 in turn comprises a computer system as described in connection with FIGS. 1 and 4 to 6.

According to the examples described, the techniques described above permit a reduced adverse effect on the efficiency of a computer system during communication across partition and/or core boundaries. This is possible by virtue of the execution of data-sending and data-receiving applications being largely decoupled. In particular, the described techniques permit minimization of critical situations requiring reciprocal preclusion of the execution of one or more applications. Furthermore, the scope of reciprocal preclusion of this kind is restricted to the greatest possible extent. This relates firstly to the number of affected instructions at application level and to the number of processor cores within the computer system that are affected by a respective lock. This allows the termination dependencies to be minimized across multiple cores. Suitable configuration of the computer system for the association of respective applications with particular processor cores also allows the scope of an overhead for switching write access rights to be reduced further. Switching of read access rights is generally not necessary, on the other hand. At the same time, the techniques described above ensure reliable transmission of communication data, in particular by ascertaining the presence of consistent communication data and the signalling of successful reception of consistent communication data by a respectively addressed data-receiving apparatus.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

TABLE 1

| |
|---|
| COM-Memory partition for communication data |
| Core 1-3-Processor core 1-3 |
| Config Lock-Configuration with write lock |
| CPU-Processor unit |
| Cur- . . . -Current parameter . . . |
| Data-Communication data |
| DataLost-Data loss |
| ECU-Controller |
| Init-Call |
| Lock-Write lock |
| MaxRetry-Predetermined repetition period |
| MEM-Memory apparatus |
| QueueEmpty-Memory queue empty |
| QueueFull-Memory queue full |
| ReadTime-Time read |
| REC-Data-receiving application |
| RLost-R-Lost index |
| R-STAT-Memory partition for receiver state data |
| Rx-Read index |
| SEND1, 2 Data-sending application 1, 2 |
| S-STAT-Memory partition for sender state data |
| WLost-W-Lost index |
| WriteBegin-Write begin index |
| WriteEnd-Write end index |
| Wx-Write index |

What is claimed is:

1. A method (200; 700; 900) for sending communication data by a data-sending application (160) executed on a first processor core (120) of a computer system (100; 400; 500; 600; 1110) and configured to write communication data to a first data memory area (140) of the computer system (100; 400; 500; 600; 1110), wherein the communication data is provided for reception by at least one data-receiving application (164) executed on a second processor core (122) of the computer system (100; 400; 500; 600; 1110), the method comprising:

ascertaining (210; 710; 910) whether a configuration of a communication channel between the data-sending application and the at least one data-receiving application provides for activation of a write lock (572; 672) configured to preclude, at least in part, at least one further data-sending application (562; 662) from writing data to the first data memory area (140);

activating the write lock (572; 672), in a case in which the configuration of the communication channel provides for the activation of the write lock (572; 622);

reading receiver state data from a second data memory area (444), different from the first data memory area, of the computer system, wherein the receiver state data indicates completed reading of earlier communication data from the first data memory area (140) by a data-receiving application of the computer system, and the data-sending application (160) is precluded from write access to the second data memory area (444);

writing (220; 720, 730, 740; 930, 940), after said reading of the receiver state data, the communication data and sender state data indicating the communication data to the first data memory area (140); and deactivating (230; 750, 752; 950, 952) the write lock, in a case in which the configuration of the communication channel provides for the activation of the write lock, wherein each of the data-sending and data-receiving applications (160, 164; 160, 164, 562; 160, 164, 662) has read access to the first data memory area (140), and the activation of the write lock (572; 672) does not adversely affect the read access by each of the data-sending and data-receiving applications (160, 164; 160, 164, 562; 160, 164, 662) to the first data memory area (140).

2. The method according to claim 1, wherein the at least one data-receiving application (164) is precluded from write access to the first data memory area (140).

3. The method according to claim 2, wherein the communication data and the sender state data is written (220; 720, 730, 740; 930, 940) to different partitions (142, 144) of the first data memory area (140).

4. The method according to claim 1, wherein at least two data-receiving applications (164) that have read access to the first data memory area (140) at the same time are executed on the computer system.

5. The method according to claim 1, wherein the data-sending application (160) is a first data-sending application, and the write lock comprises an intra-core write lock (572) configured to preclude a second data-sending application (562) executed on the first processor core (120) of the computer system from write access to the first data memory area (140).

6. The method according to claim 5, wherein a functionality of the intra-core write lock (572) is stored in a core-local memory (570) associated with the first processor core (120).

7. The method according to claim 1, wherein the data-sending application (160) is a first data-sending application, and the write lock comprises an inter-core write lock (672) configured to preclude a second data-sending application (662) executed on a third processor core (624) of the computer system from write access to the first data memory area (140).

8. The method according to claim 7, wherein a functionality of the inter-core write lock (672) is stored in the first data memory area (140).

9. The method according to claim 1, further comprising, before ascertaining whether the configuration of the communication channel provides for activation of the write lock:
configuring the communication channel for the write lock (572; 672) at least in part on the basis of at least one further data-sending application (562; 662).

10. The method according to claim 1, wherein the communication data is provided for reception by the at least one data-receiving application (164) according to a first-in-first-out, FIFO, semantic.

11. The method according to claim 1, wherein the second data memory area (444) comprises core-local memory associated with the second processor core (122).

12. The method according to claim 11, wherein the first and second data memory areas (140, 444) comprise a shared address space of the computer system.

13. A method (300; 800; 1000) for receiving, by a data-receiving application (164), communication data written to a first data memory area (140) of the computer system (100; 400; 500; 600; 1110) by a data-sending application (160) executed on a first processor core (120) of a computer system (100; 400; 500; 600; 1110), wherein the data-receiving application (164) is executed on a second processor core (122) of the computer system (100; 400; 500; 600; 1110), comprising:

reading (310; 820; 1010), by the data-receiving application (164), sender state data from the first data memory area (140);

ascertaining (320; 820; 1010) whether the sender state data indicates the presence of consistent communication data in the first data memory area (140); and reading (330; 830; 1020), by the data-receiving application (164), the communication data from the first data memory area (140), in a case in which the sender state data indicates the presence of consistent communication data, wherein:
the sender state data comprises first sender state data, indicating a beginning (720) of writing of communication data by the data-sending application of the computer system, and second sender state data, indicating an ending (740) of writing of communication data by the data-sending application of the computer system, and the ascertaining (320; 820) of whether the sender state data indicates the presence of consistent communication data comprises comparing the first and second sender state data with one another.

14. The method according to claim 13, wherein the communication data is received according to a register semantic.

15. A non-transient computer-readable storage medium storing a computer program product comprising portions of program code that, when executed on a processor-controlled computer system, causes the computer system to perform the method according to claim 1.

16. A computer system (100; 400; 500; 600; 1110) for sending communication data by a data-sending application (160) executed on a first processor core (120) of the computer system (100; 400; 500; 600; 1110) and configured to write communication data to a first data memory area (140) of the computer system (100; 400; 500; 600; 1110), wherein the communication data is provided for reception by at least one data-receiving application (164) executed on a second processor core (122) of the computer system (100; 400; 500; 600; 1110), wherein the computer system (100; 400; 500; 600; 1110) is configured to:

ascertain whether a configuration of a communication channel between the data-sending application (160) and the at least one data-receiving application (164) provides for activation of a write lock (572; 672) configured to preclude, at least in part, at least one further data-sending application (562; 662) from writing data to the first data memory area (140);

activate the write lock (572; 672), in a case in which the configuration of the communication channel provides for the activation of the write lock (572; 622);

read receiver state data from a second data memory area (444), different from the first data memory area, of the computer system, wherein the receiver state data indicates completed reading of earlier communication data from the first data memory area (140) by a data-receiving application of the computer system, and the data-sending application (160) is precluded from write access to the second data memory area (444);

after having read the receiver state data, write the communication data and sender state data indicating the communication data to the first data memory area (140); and deactivate the write lock (572; 672), in a case in which the configuration of the communication channel provides for the activation of the write lock (572; 672), wherein each of the data-sending and data-receiving applications (160, 164; 160, 164, 562; 160, 164, 662) has read access to the first data memory area, and the activation of the write lock does not adversely affect the read access by each of the data-sending and data-receiving applications (160, 164; 160, 164, 562; 160, 164, 662) to the first data memory area (140).

17. The computer system according to claim 16, wherein the computer system is part of a motor vehicle controller (1110).

18. A computer system according to claim 16, wherein the communication data is provided for reception by the at least one data-receiving application (164) according to a first-in-first-out, FIFO, semantic.

19. A computer system (100; 400; 500; 600; 1110) for receiving, by a data-receiving application (164), communication data written to a first data memory area (140) of the computer system (100; 400; 500; 600; 1110) by a data-sending application (160) executed on a first processor core (120) of the computer system (100; 400; 500; 600; 1110), wherein the data-receiving application (164) is executed on a second processor core (122) of the computer system (100; 400; 500; 600; 1110), wherein the computer system (100; 400; 500; 600; 1110) is configured to:

read, by the data-receiving application (164), sender state data from the first data memory area (140);

ascertain whether the sender state data indicates the presence of consistent communication data in the first data memory area (140); and read, by the data-receiving application (164), the communication data from the first data memory area (140), in a case in which the sender state data indicates the presence of consistent communication data wherein:

the sender state data comprises first sender state data, indicating a beginning (720) of writing of communication data by the data-sending application of the computer system, and second sender state data, indicating an ending (740) of writing of communication data by the data-sending application of the computer system, and the ascertaining of whether the sender state data indicates the presence of consistent communication data comprises comparing the first and second sender state data with one another.

20. A computer system according to claim 19, wherein the communication data is received according to a register semantic.

21. A motor vehicle controller (1110) comprising a computer system according to claim 16.

22. A motor vehicle (1100) comprising a motor vehicle controller (1110) according to claim 21.

* * * * *